Dec. 2, 1969 R. L. JAMES 3,482,174

PULSE SAMPLE TYPE DEMODULATOR INCLUDING FEEDBACK STABILIZING MEANS

Filed June 17, 1966

INVENTOR.
ROBERT L. JAMES
BY [signature]
ATTORNEY

United States Patent Office 3,482,174

Patented Dec. 2, 1969

3,482,174

PULSE SAMPLE TYPE DEMODULATOR INCLUDING FEEDBACK STABILIZING MEANS

Robert L. James, Bloomfield, N.J., assignor to The Bendix Corporation, a corporation of Delaware Filed June 17, 1966, Ser. No. 558,467

Int. Cl. H03d *1/18*

U.S. Cl. 329—101 10 Claims

ABSTRACT OF THE DISCLOSURE

A demodulator including a sampler for sampling an alternating current input signal and a gate for providing a corresponding direct current output. The direct current output is applied in negative feedback relation to the sampler for stabilizing purposes.

This invention relates to demodulators and, more particularly, to apparatus responsive to an alternating current input for providing a direct current output corresponding thereto.

Flight control systems or other servo systems require demodulators for converting alternating current input signals into direct current signals. It is desirable to accomplish the conversion with simplified circuitry having a high degree of reliability. Moreover, the demodulator must have a high quadrature rejection ratio, fast response and a high degree of stability.

One object of this invention is to provide a novel demodulator having simplified circuitry and high reliability.

Another object of this invention is to provide a novel demodulator having a high quadrature rejection ratio and a fast response, and employing pulse sampling techniques for demodulating an alternating current input signal to provide a corresponding direct current output signal.

Another object of this invention is to provide a novel demodulator having low output impedance and a high degree of stability.

This invention contemplates a device for demodulating an alternating current input signal so as to provide a direct current output signal, comprising: means for providing pulses corresponding to the alternating current input signal; means responsive to the pulses for providing a direct current output signal corresponding to the alternating current input signal; and means connected to the last mentioned means and connected to the first mentioned means for stabilizing the device.

These and other objects and features of the invention are pointed out in the following description in terms of the embodiment thereof which is shown in the accompanying drawings.

Figures 1, 2, 3, 4, 5:
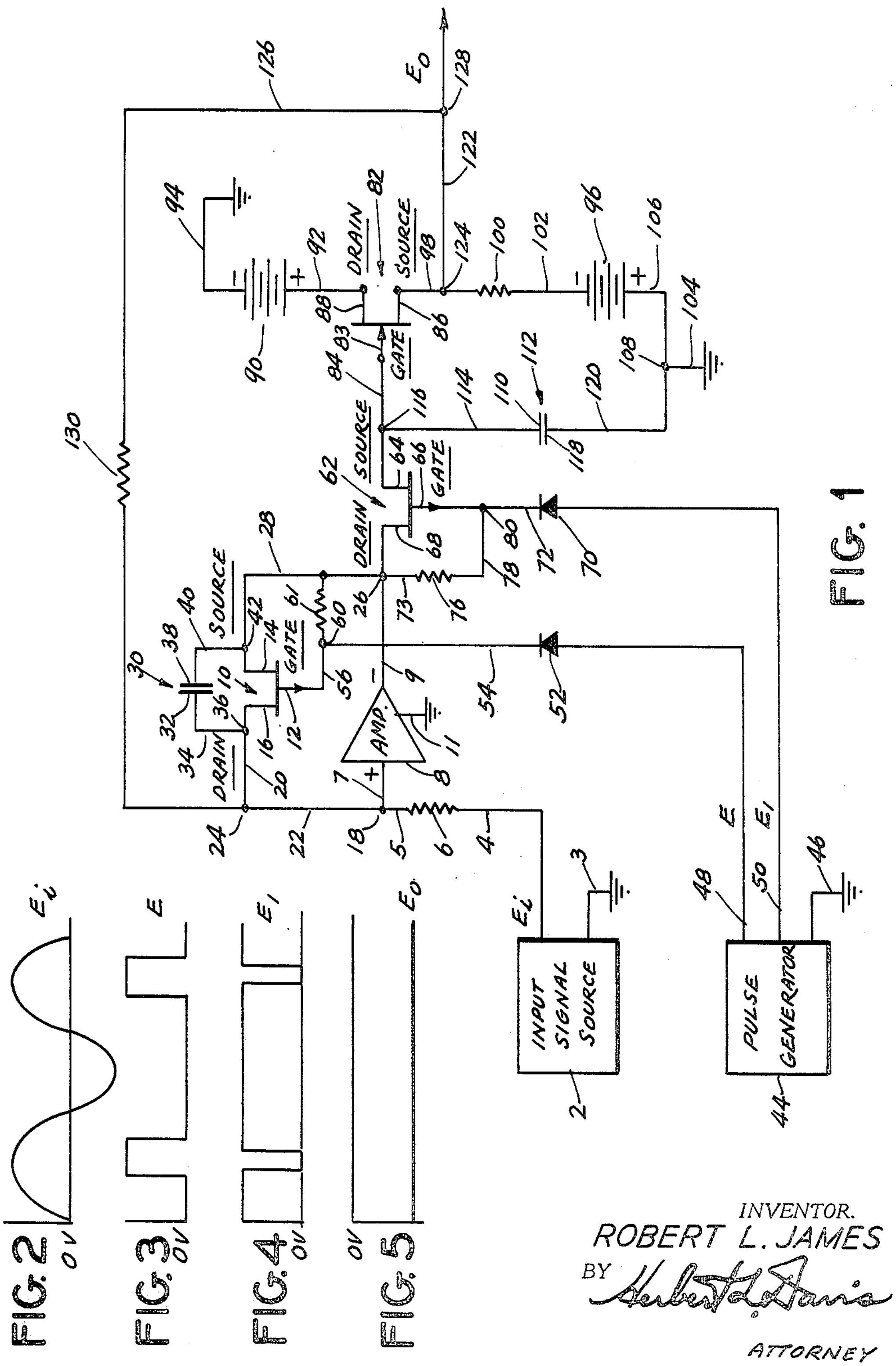
FIGURE 1 is an electrical schematic diagram of the demodulator in accordance with the present invention.
FIGURE 2 is a graphical representation showing the wave form of the alternating current input signal $E_1$ applied to the demodulator of FIGURE 1.
FIGURE 3 is a graphical representation showing the wave form of a pulse E applied by a pulse generator to drive the demodulator of FIGURE 1.
FIGURE 4 is a graphical representation showing the wave form of another pulse $E_1$ applied by the pulse generator to drive the demodulator of FIGURE 1.
FIGURE 5 is a graphical representation showing the direct current output $E_0$ provided by the demodulator of FIGURE 1 in response to the alternating current input signal $E_i$ shown in FIGURE 1.

With reference to FIGURE 1, an input signal source 2 having a grounded input-output conductor 3 and an output conductor 4 provides at the output conductor 4 a suppressed carrier modulated alternating current input signal $E_i$ such as that used in automatic flight control systems or other servo systems. The suppressed carrier modulated alternating current input signal $E_i$ has a sinusoidal wave form as shown in the graphical representation of FIGURE 2 and is applied to an amplifier 8 through the output conductor 4 of the input signal source 2, a resistor 6, a conductor 5 and an input conductor 7 of the amplifier 8 joining the conductor 5 at a point 18. The amplifier 8 has an output conductor 9 and a grounded input-output conductor 11.

A field effect transistor 10 having a gate element 12, a source element 14 and a drain element 16 is connected in the feedback path of the amplifier 8. The drain element 16 of the field transistor 10 is connected to the input conductor 7 of the amplifier 8 through a conductor 20 joining a conductor 22 at a point 24 and the conductor 22 joining the input conductor 7 at the point 18. The source element 14 of the field effect transistor 10 is connected to the output conductor 9 of the amplifier 8 through a conductor 28 joining the output conductor 9 at a point 26.

A capacitor 30 having a plate 32 and a plate 38 is connected to the drain element 16 of the field effect transistor 10 through a conductor 34 leading from the plate 32 and joining the conductor 20 leading to the drain element 16 at a point 36. The capacitor 30 is connected to the source element 14 of the field effect transistor 10 through a conductor 40 leading from the plate 38 and joining the conductor 28 leading to the source element 14 at a point 42.

A pulse generator 44 is operated in synchronism with the input signal source 2. The pulse generator 44 has a grounded output conductor 46 and an opposite output conductor 48 and another opposite output conductor 50. There is provided at the output conductor 48 a positive pulse E having a wave form as shown in the graphical representation of FIGURE 3 while the pulse generator 44 further provides at the other output conductor 50 a positive pulse $E_1$ having an opposite wave form as shown in the graphical representation of FIGURE 4. It may be seen by comparing FIGURES 3 and 4, that during the time that the positive pulse E is at a predetermined level above ground, the positive pulse $E_1$ is at ground level. It may further be seen by comparing FIGURES 2, 3 and 4 that the positive pulses E and $E_1$ are effective when the in-phase component of the input signal $E_i$ is zero and when the the quadrature component thereof crosses zero.

The positive pulse E at the output conductor 48 of the pulse generator 44, is applied to the gate element 12 of the field effect transistor 10 through the conductor 48 connected to an anode element of a diode 52 having a catthode element connected to a conductor 54 leading to a conductor 56 joining the conductor 54 at a point 60 and in turn leading to the gate element 12 of the field effect transistor 10. A resistor 61 is connected between the point 60 and the conductor 28. The positive pulse E when applied to the gate element 12 renders the field effect transistor 10 nonconductive or cut-off and thus effective to gate the amplifier 8 so that the amplifier 8 samples the input signal $E_i$ when the input signal $E_i$ is at its maximum value and provides a pulse at the output conductor thereof. The amplifier 8 is of the sign inverting type, so that if the innput signal $E_i$ applied to the input conductor 7 of the amplifier 8 is positive, the pulse provided at the output conductor 9 of the amplifier 8 is negative, and if the input signal $E_i$ is negative the pulse at the output conductor 9 is positive.

The positive pulse $E_1$ at the output conductor 50 of the pulse generator 44 is applied to a gate element 66 of a field effect transistor 62 through the conductor 50 which is connected to an anode element of a diode 70 having a cathode element connected to a conductor 72 leading to the gate element 66 of the field effect transistor 62. The field effect transistor 62 has a source element 64 and a drain element 68. The output conductor 9 of the amplifier 8 leads to the drain element 68 of the field effect transistor 62. A resistor 76 is connected across the drain element 68 and the gate element 66 of the transistor 62 through a conductor 78 joining the conductor 72 leading to the gate element 66 at a point 80 and a conductor 73 joining the output conductor 9 of the amplifier 8, leading to the drain element 68, at the point 26. The transistor 62 is rendered non-conductive or cut-off by the positive pulse $E_1$ applied to the gate element 66 thereof and effective at other times or during the time that the amplifier 8 is gated by the transistor 10, to conduct the pulse provided at the output conductor 9 of the amplifier 8, which pulse is applied to the drain element 68 of the transistor 62 through the conductor 9. A pulse is thus provided at a conductor 84 leading from the source element 64 of the transistor 62.

The source element 64 of the field effect transistor 62 is connected to a hold capacitor 112 at a plate 110 of the capacitor 112 through a conductor 114 joining the conductor 84 leading from the source element 64 at a point 116, whereby the capacitor 112 is charged by the pulse at the conductor 84. A plate 118 of the capacitor 112 is connected to a grounded conductor 104 through a conductor 120 joining the grounded conductor 104 at a point 108.

A field effect transistor 82 having a gate element 83, a source element 86 and a drain element 88 is connected to the negative terminal of a suitable source of direct current shown as a battery 96 through a conductor 102, a resistor 100 and a conductor 98 leading to the source element 86 of the transistor 82. The positive terminal of the battery 96 is connected to the grounded conductor 104 through a conductor 106 joining the grounded conductor 104 at the point 108. The field effect transistor 82 is connected to the positive terminal of a suitable source of direct current shown as a battery 90 through a conductor 92 leading to the drain element 88 of the transistor 82. The negative terminal of the battery 90 is connected to a grounded conductor 94. The field effect transistor 82 is biased by the batteries 90 and 96 and so as to render effective at an output conductor 22 leading from a point 124 on the source conductor 98 either a positive or a negative output pulse dependent upon the controlling pulse applied to the gate element 83 thereof. The controlling pulse is applied to the gate element 83 in accordance with the discharge rate and polarity of the charge applied to capacitor 112. This controlling pulse is positive when the input signal $E_i$ is negative and negative when the input signal $E_i$ is positive due to the sign inverting action of the amplifier 8. The field effect transistor 82 thus provides at the output conductor 122 a direct current, low impedance output signal $E_o$ corresponding in amplitude but opposite in polarity to the alternating current input signal $E_i$.

When the field effect transitor 82 thus effects at the output conductor 122 the output signal $E_o$ in response to the controlling positive or negative pulse applied to the gate 83 thereof, a closed negative feedback loop is provided including a conductor 126 connected to the output conductor 122 at a point 128, a resistor 130 and the conductor 22 connected to the input conductor 7 of the amplifier 8 at the point 18, whereby the direct current output signal $E_o$ is combined with the alternating current input signal $E_i$ in a sense so that the signals $E_o$ and $E_i$ are algebraically subtracted. The effect of providing negative feedback in this manner is to minimize the drift of the transistor 82; i.e., to insure that the direct current output signal $E_o$ is zero when the alternating current input signal $E_i$ is zero.

With reference to FIGURES 2, 3 and 4, it may be seen that the heretofore noted negative feedback loop is closed only once during the cycle of the alternating current input signal $E_i$; that is, when the amplifier 8 is gated by the transistor 10 in response to the pulse $E_1$ so as to sample the input signal $E_i$. In order to provide the desired stabilization when the feedback loop is open, the capacitor 112 is so selected as to have hold characteristics for providing a continuous output at the output conductor 122, thus insuring stabilization independent of whether the feedback loop is opened or closed.

Operation

The demodulator of the present invention demodulates the suppressed carrier modulated alternating current input signal $E_i$ provided by the input signal source 2 at the output conductor 4 thereof to provide at the output conductor 122 a direct current demodulated low impedance output signal $E_o$ corresponding in amplitude, but opposite in polarity to the alternating current input signal $E_i$.

The suppressed carrier modulated alternating current input signal $E_i$ is applied to the amplifier 8. The positive pulse E provided by the pulse generator 44 is applied to the field effect transistor 10 connected in the feedback path of the amplifier 8, so that once each cycle of the input signal $E_i$, the amplifier 8 is gated by the transistor 10 to sample the input signal $E_i$, and to provide at the output conductor 9 thereof a pulse proportional in amplitude but opposite in polarity to the input signal $E_i$.

With reference to the graphical representations of FIGURES 2 and 3, the positive pulse E from the pulse generator 44 occurs at the 90 degree point of the in-phase component of the signal $E_i$ from the input signal source 2. At this instant the in-phase component of the signal $E_i$ is at a maximum value while the quadrature component of the signal $E_i$ crosses zero during the time interval that the signal $E_i$ is at a maximum value. The pulse at the output conductor 9 of the amplifier 8 is thus independent of the quadrature component of the input signal $E_i$.

The pulse provided by the amplifier 8 at the output conductor 9 thereof is applied to the series connected field effect transistor 62. The transistor 62 is rendered conductive during the intervals between the positive pulse $E_1$ supplied by the pulse generator 44, and during the time that the transistor 10 is rendered non-conductive so as to cause the amplifier 8 to become effective to apply an output pulse at the output conductor 9 of the amplifier 8 and the transistor 62 to apply therethrough a pulse to the conductor 84 leading from the source element 64 of the transistor 62.

The pulse at the conductor 84 leading from the source element 64 of the transistor 62 charges the hold capacitor 112. The transistor 82 is coupled to the capacitor 112 and biased by the batteries 90 and 96 so as to provide at the output conductor 122 a direct current signal $E_o$ shown in the graphical representation of FIGURE 5, with the direct current output signal $E_o$ corresponding in amplitude but opposite in polarity to the alternating current input signal $E_i$.

The field effect transistor 82 employed in the embodiment of the invention shown in FIGURE 1 is a metal oxide shield depletion mode type field effect transistor, connected in a source follower type of connection. A field effect transistor of this type, connected as shown in FIGURE 1, provides high input impedance which is essential to eliminate undesirable saw tooth ripple in the direct current output signal $E_o$, thus eliminating the need for subsequent filtering of the output signal $E_o$ at the output conductor 122. An important feature of the present invention is the application of negative feedback to the amplifier 8 so as to compensate for the inherent drift of the transistor 82, thus insuring a high degree of stabilization. It is significant that the desired stabilization is provided independent of whether the feedback loop is open or closed, due to the holding action of the capacitor 112.

The device of the present invention uses pulse sampling techniques to demodulate and greatly reduce the quadrature component of an alternating current input signal, and to provide a direct current output signal corresponding to the alternating current input signal. A device constructed in accordance with the present invention is particularly adaptable to micro circuitry construction, whereby the device is rendered light in weight and compact in size, has a fast response and a high degree of reliability.

The novel demodulator of the present invention may be used in a device such as that disclosed and broadly claimed in the copending U.S. application Ser. No. 558,327, filed June 17, 1966, by Robert L. James and assigned to The Bendix Corporation, assignee of the present invention.

What is claimed is:

1. A device for demodulating an alternating current input signal, comprising:

sampling means for sampling the alternating current input signal at a predetermined time and for providing a pulse corresponding to the sampled signal;

gating means connected to the sampling means for conducting the pulse provided by the sampling means and for providing a corresponding direct current output signal;

means providing control pulses to said gating means;

means biasing said gating means to provide either positive or negative output pulses depending upon the nature of said control pulses; and stabilizing means having an output connected to the sampling means and an input connected to the gating means for applying the direct current output signal provided by the gating means in negative feedback relation to said sampling means.

2. A device as described by claim 1, wherein the sampling means comprises:

an amplifier for receiving the alternating current input signal;

a pulse generator for providing controlling pulses at the predetermined time; and control means connected to the amplifier and connected to the pulse generator and responsive to the controlling pulses provided by the pulse generator for rendering the amplifier effective to sample the alternating current input signal at the predetermined time so that the amplifier provides a pulse corresponding to the alternating current input signal.

3. A device as described by claim 2, wherein:

the pulse generator provides the controlling pulses when the in-phase component of the alternating current input signal is maximum and the quadrature component thereof crosses zero, so that the pulse provided by the amplifier when the amplifier is rendered effective by the control means to sample the alternating current input signal corresponds to the in-phase component of the alternating current input signal and is independent of the quadrature component thereof.

4. A device as described by claim 3, wherein:

the pulse provided by the amplifier is proportional in amplitude to the in-phase component of the alternating current input signal, and has a polarity opposite to that of the alternating current input signal.

5. A device as described by claim 2, wherein the control means comprises:

a field effect transistor having a gate element, a source element and a drain element;

a capacitor connected across the drain element and the source element;

the drain element of the field effect transistor being connected to the input of the amplifier, and the source element of the field effect transistor being connected to the output of the amplifier; and the gate element of the field effect transistor being connected to the pulse generator so that the field effect transistor is rendered cut off by the pulse provided thereby to render the amplifier effective to sample the alternating current input signal.

6. A device as described by claim 1, wherein the gating means comprises:

a pulse generator for providing controlling pulses when the sampling means samples the alternating current input signal;

a first current flow control device connected to the sampling means and connected to the pulse generator, and responsive to the controlling pulses provided by the pulse generator for conducting the pulse provided by the sampling means;

a second current flow control device connected to the first current flow control device; and biasing means connected to the second current flow control device for rendering the second current flow control device effective in response to the first current flow control device to provide a direct current output signal corresponding in amplitude to the input signal.

7. A device as described by claim 6 including:

a capacitor for coupling the first current flow control device to the second current flow control device;

the capacitor being charged by the pulse provided by the first current flow control device; and the direct current output provided by the second current flow control device being in accordance with the discharge rate of the capacitor.

8. A device as described by claim 7 wherein:

the first current flow control device has a gate element, a source element and a drain element;

the second current flow control device has a gate element, a source element and a drain element;

the pulse generator is connected to the gate element of the first current flow control device and the sampling means is connected to the drain element thereof;

the source element of the first current flow control device is connected to the gate element of the second current flow control device;

the capacitor couples the source element of the first current flow control device to the gate element of the second current flow control device; and the biasing means is connected to the drain element and to the source element of the second current flow control device, with the direct current output signal being provided at the source element of the second current flow control device.

9. A device as described by claim 8, including:

negative feedback means for connecting the source element of the second current flow control device to the input of the amplifier for algebraically substracting the direct current output signal from the alternating current input signal in a sense so that the direct current output signal is zero when the alternating current input signal is zero.

10. A device as described by claim 8, including:

means connecting the biasing means to the drain element and to the source element of the second current flow control device so as to bias the drain element of the second current flow control device in one sense, and the source element thereof in an opposing sense.

References Cited

UNITED STATES PATENTS

| | | | |
|---|---|---|---|
| 3,154,749 | 10/1964 | Perkins | 329—50 X |
| 3,229,218 | 1/1966 | Sickles et al. | 307—251 X |
| 3,246,177 | 4/1966 | Schroeder | 329—50 X |
| 3,378,779 | 4/1968 | Priddy | 307—251 X |

ALFRED L. BRODY, Primary Examiner

U.S. Cl. X.R.

307—240, 251; 325—329; 329—50, 178, 169; 330—28